United States Patent [19]
Stelter

[11] Patent Number: 5,729,698
[45] Date of Patent: Mar. 17, 1998

[54] FIRE PUMP DATA SYSTEM FOR PRODUCING SUBMITTALS

[75] Inventor: William F. Stelter, Libertyville, Ill.

[73] Assignee: Master Control Systems, Inc., Lake Bluff, Ill.

[21] Appl. No.: 441,862

[22] Filed: May 16, 1995

[51] Int. Cl.$^6$ .................................................. G06F 15/22
[52] U.S. Cl. ........................ 395/226; 395/227; 235/383
[58] Field of Search ........................ 364/401, 403, 364/407; 235/383; 395/226, 227

[56] References Cited

U.S. PATENT DOCUMENTS

| | | | |
|---|---|---|---|
| 5,053,956 | 10/1991 | Donald | 364/401 |
| 5,319,542 | 6/1994 | King | 364/401 |
| 5,451,998 | 9/1995 | Hamrick | 364/401 |
| 5,475,585 | 12/1995 | Bush | 364/401 |

*Primary Examiner*—Jeffery Hofsass
*Assistant Examiner*—Albert K. Wong
*Attorney, Agent, or Firm*—Jon Carl Gealow

[57] ABSTRACT

A method for compiling data and printing a submittal for fire pump system installations is disclosed. The program is designed for use on a computer with a laser printer. A master file having drawings and data relating to fire pump, driver, and control systems is stored on the computer. A user may select equipment based on desired characteristics and compose and print a submittal having data on the selected equipment as well as the related drawings. The program also allows a user to add drawings or modify the data in the master file.

28 Claims, 13 Drawing Sheets

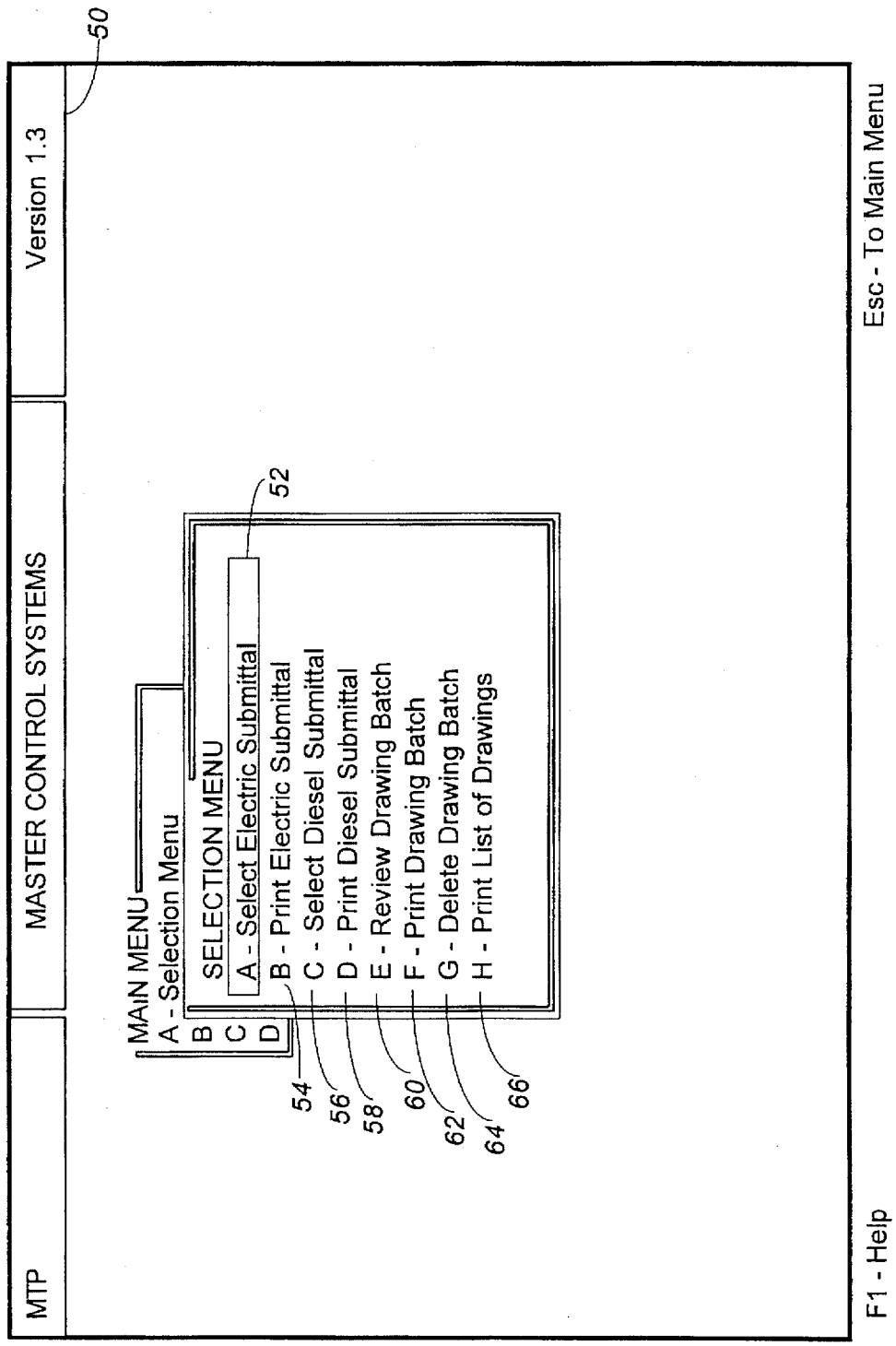

Fig. 4A

ELECTRIC SUBMITTAL SELECTION — 70

—Job Information— 72

Job #: 1
Desc: DEMO - ELECTRIC
Date: 7/8/94

—Customer Information— 74

Code: 1
Contact: Never Shops
Name: Best Fire Protection Co.
Address #1: 234 I Wish Drive
Address #2:
City: Neverland
State: IL
Zip:

—Processing Information—

Number of Submittal sets in submittal letter: 1
Number of submittal sets to be printed: 1
Person signing submittal cover letter: Joe Fire Pump
Title of person signing: Fire Pump Sales
Name of company sending submittal: Master Control Systmes, Inc.

—Jobs— 78

76

F1 - Help          Ctrl + Y - Function Help          Esc - To Main Menu

Fig. 4B

ELECTRIC SUBMITTAL SELECTION

Fire Pump Info
- Pump Type:
- Model:
- GPM:
- PSI:
- Shutoff PSI:
- Speed:
- Desc:

- Trimmed GPM:
- Trimmed PSI:
- Trimmed Shutoff:
- Rotation:

Motor Info
- Make: NEMA STANDARD
- Model:
- Volts: 460    Phase: 6    H.P.: 100
- FLA:    Speed: 1800    Freq.: 60
- Desc:    Frame: 404TS

System Info
- Design Suction PSI:
- Calc Discharge PSI:

Fire Pump Accessory Info

| Accessory | Description |
|---|---|
| 1. AIRRELEASE | AIR RELEASE VALVE |
| 2. GAUGEDDISCH | DISCHARGE GAUGE |
| 3. GAUGESUCT | SUCTION GAUGE |
| 4. HV-ANGLE | ANGLE HOSE VALVE |
| 5. RELIEF-1/2 | 1/2" CASING RELIEF VALVE |
| 6. | |
| 7. | |
| 8. | |
| 9. | |
| 10. | |

| Accessory | Description |
|---|---|
| 11. | |
| 12. | |
| 13. | |
| 14. | |
| 15. | |
| 16. | |
| 17. | |
| 18. | |
| 19. | |
| 20. | |

F1 - Help        Ctrl + Y - Function Help        F2 - Display Avail. Types        Esc - To Main Menu

Fig. 4D

ELECTRIC SUBMITTAL SELECTION — 120
— 124

┌─ Jockey Pump Info ─────────────────────┬─ Jockey Pump Motor Info ──────────────┐
│ Model:                                 │ Motor HP: 1.5                         │
│ GPM:                                   │ Volts A.C.: 460                       │
│ PSI:                                   │ Phase: 3                              │
│ Desc:                                  │ Frequency: 60                         │
│                                        │ Desc:                                 │
└──────122                               └── 132, 134                            │

— Jockey Pump Accessories — 126

| Code | Description |
|------|-------------|
| 1. RELIEF-1/2 | 1/2" CASING RELIEF VALVE |
| 2. | |
| 3. | |
| 4. | |
| 5. | |
| 6. | |

— Jockey Pump Controller Info — 128
Controller: PMC    Type:    Desc:

— Jockey Pump Controller Options and Modifications — 130

| Option | Description | Modification | Description |
|--------|-------------|--------------|-------------|
| 1. | CONTROL TRANSFORMER | 1. A1 | AUX RUNNING CONTACTS, 1A1B |
| 2. | LINE FUSES | 2. H3 | SPACE HEATER & HUMIDISTAT |
| 3. | | 3. | |
| 4. | | 4. | |
| 5. | | 5. | |

136 ⤴                                138 ⤴

F1 - Help    Ctrl + Y - Function Help    F2 - Display Avail. Models    Esc - To Main Menu

Fig. 5

SELECTION MASTER FILE
68

Enter Job Number To Print : [1]

Number of submittal sets in submittal letter : [1]

Number of submittal sets to be printed : [1]

Cover Letter starting line : [15]

Submittal report starting line : [5]

Print selected drawings now? (Y/N) : [N]

Send this report to the Screen, Printer, or Disk file : [ ]

F1 - Help

Esc - To Main Menu

Fig. 7

FIRE PUMP MASTER FILE — 178

Fire Pump Type ⌄

Shutoff PSI

Model ⌄

GPM ⌄

PSI ⌄

Speed ⌄

Description

F1 - Help  End - Print  F2 - Display Available Types  Esc - To Main Menu

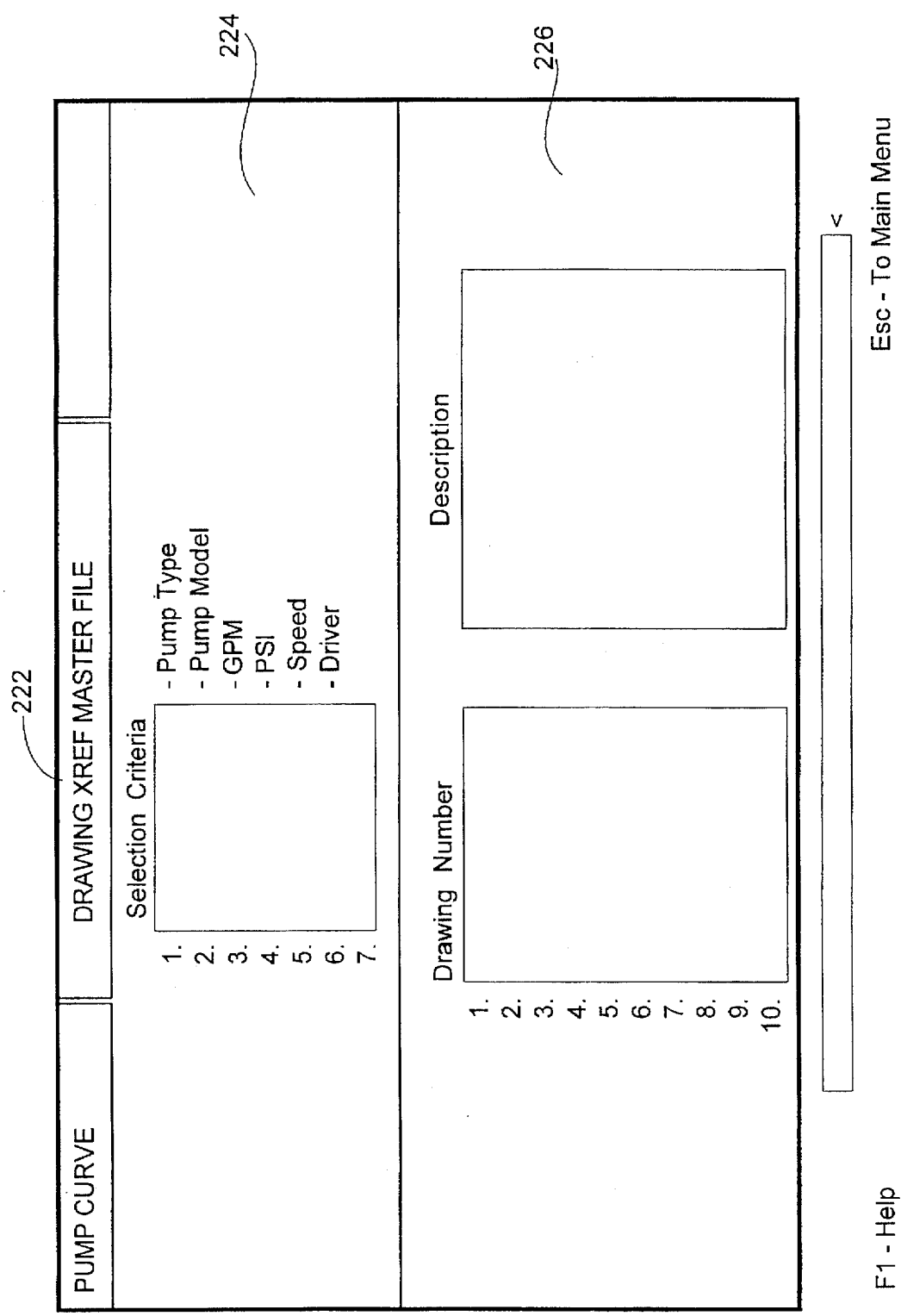

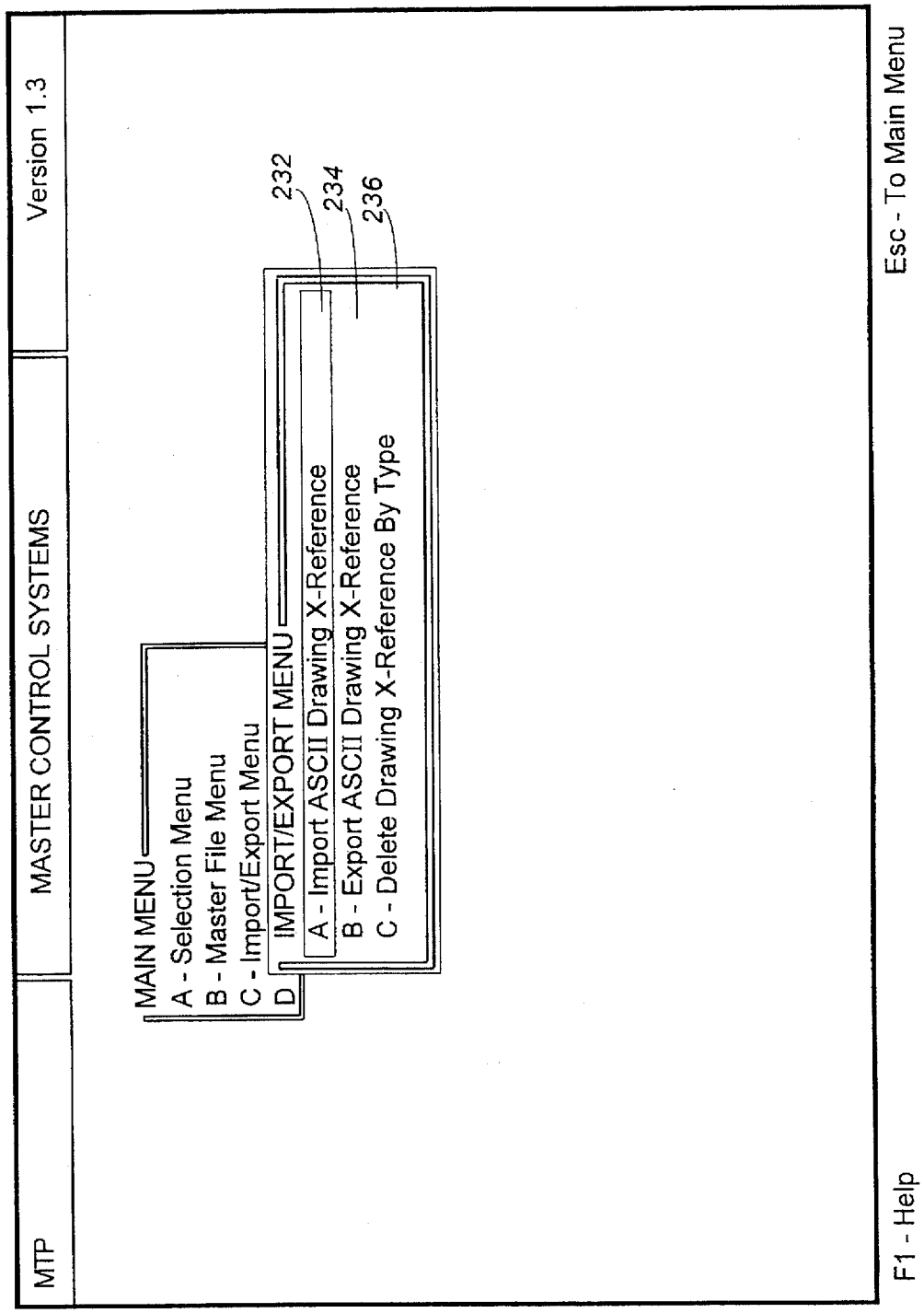

FIRE PUMP DATA SYSTEM FOR PRODUCING SUBMITTALS

FIELD OF THE INVENTION

The present invention relates, generally, to the field of producing detailed construction submittals. More particularly, it relates to a system for managing and recording fire pump drawings and related documentation which provides the production and printing of customized submittals including drawings and various reports.

BACKGROUND OF THE INVENTION

Dealers in fire equipment such as pumps, drivers and controllers, must draft, compile and send submittals to contractors after successfully bidding such equipment. The submittals are complex drawings and documents which include pumps, drivers, fire control equipment and accessories.

Presently, a dealer must be familiar with several hundred different ratings on scores of products in order to select and specify particular equipment for a submittal. Books having several hundred drawings on specific parts and products are used as a source of drawings for preparing the submittal. A dealer must pull the relevant drawings from these books and copy the drawings for inclusion in the submittal.

Thus, the selection and copying of such drawings and data is time consuming and difficult to manage. Additionally, the great amount of information required may result in errors or exclusion of necessary data, parts or drawings. Another problem is the copies of the drawings may be unreadable due to an inadequate copying machine. Finally, selection of the necessary drawings and data to be included in a submittal is cumbersome since typically, there are large quantities of documents which must be examined.

Thus, a need exists for an efficient system which allows a user to select drawings, assemble drawings and related data, so as to produce a submittal or report. Further a need exists to produce acceptable drawings of the necessary parts for the submittal.

SUMMARY OF THE INVENTION

It is an object of this invention to provide a system which will allow users to quickly produce submittals including drawings and related data for fire pump systems. It is a further object of this invention to produce a report on drawings and equipment selected for a fire pump system. It is a further object of this invention to provide for the printing of drawings for reference.

In accordance with this invention, a system for producing submittals for fire pump, driver, and control systems is disclosed. The system is run on a computer having a storage device and an input device. A printer may be coupled to said computer. A master file is stored in the storage device. The master file has data representing fire pump, driver, and control equipment drawings and information related to said fire pump, driver, and control equipment drawings. The data in the master file may be accessed by a program which allows a user to derive selected information and selected drawings from the storage device and print a submittal.

The program is thus capable of producing submittals for fire pump, driver, and control systems using the computer. The program allows storing data representing a plurality of drawings related to fire pump, driver, and control equipment in a master file. Further data related to said plurality of drawings is stored in the master file. The user selects submittal data from the further data related to the drawings and selects drawings from the selected submittal data. A submittal including the selected submittal data and the selected drawings derived from the master file may be generated.

The submittal includes selections from a plurality of records relating to customer information; a plurality of records relating to fire pump information; a plurality of records relating to fire control system information; a plurality of records relating to fire pump accessory information; a plurality of records relating to fire pump control information; and a plurality of records relating to jockey pump information.

A method for storing data on equipment for fire control systems on a computer is also disclosed. This method starts with storing a plurality of drawings related to fire control equipment in a master file on the computer storage device. Each of these drawings is related to a piece of fire control system equipment. Data is also stored relating to the plurality of drawings in the master file. The data is composed of a plurality of records relating to a piece of fire control system equipment. Each of the plurality of records has at least one field defining characteristics of the associated piece of fire control system equipment. A user may select various drawings to be printed.

The above and other objects, features, and advantages of the present invention will become apparent from the following description with reference to the attached drawings.

BRIEF DESCRIPTION OF THE DRAWINGS

FIG. 3 shows a selection screen which displays the selection menu according to the present invention;

FIG. 4A shows a first submittal selection screen display according to the present invention;

FIG. 4B shows a second submittal selection screen display according to the present invention;

FIG. 4D shows a fourth submittal selection screen display according to the present invention;

FIG. 5 shows a print screen display according to the present invention;

FIG. 7 shows a master file screen display according to the present invention;

FIG. 10 shows a master file drawing screen according to the present invention; and FIG. 11 shows an import/export menu screen according to the present invention.

DETAILED DESCRIPTION OF THE PREFERRED EMBODIMENT

Figure 1:
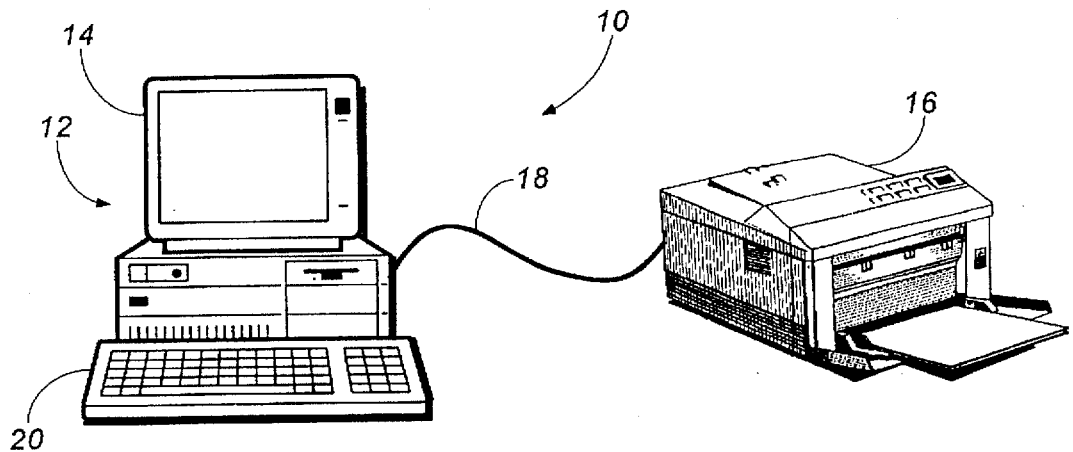
FIG. 1 shows a general view of a system for printing submittals including drawings and other information.

FIG. 1 shows a submittal report system 10 according to the present invention. The submittal report system 10 includes a computer 12, a monitor 14, and a printer 16. The computer 12 includes a hard drive (not pictured) and is coupled to the laser printer 16 via a cable 18. The computer is also coupled to an input device such as a keyboard 20 which allows the user to control the operation of a submittal program according to the present invention. The computer 12 may be an IBM type personal computer although the present invention may run on other computers or similar devices. The computer 12 preferably has at least 512k of random access memory (RAM) and at least 42 Megabytes of hard drive storage and is capable of running MS-DOS™ version 3.3 or higher. The laser printer 16 is preferably capable of emulating an HPIII Laserjet™ or better printer. Of course other types of printers may be used with the present invention.

Figure 2:
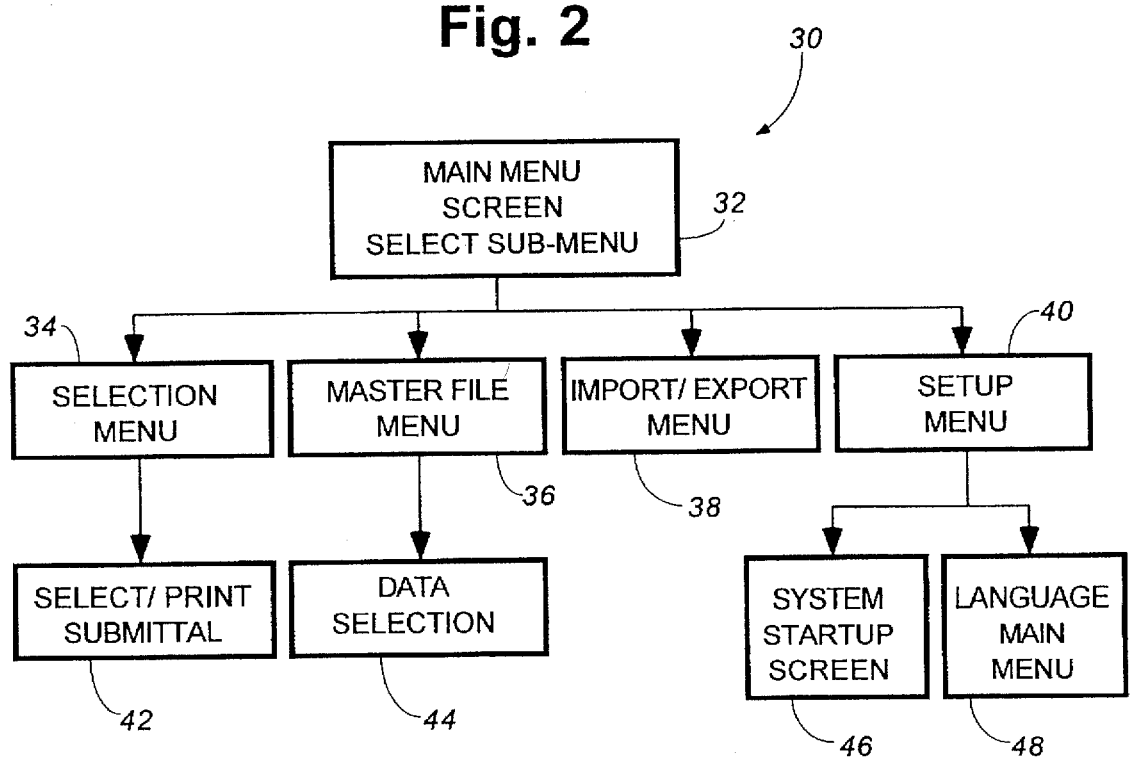
FIG. 2 shows a flow diagram of the menu options available in the system according to the present invention.

FIG. 2 shows a flow diagram 30 of the options available to a user of the present invention. The program according to the present invention is written in TAS Professional DOS programming language for IBM type personal computers. However, other software languages and hardware may be used in accordance with the present invention. The user is first presented with a main menu screen 32. The main menu screen 32 makes four options available to a user. These include a Selection Menu 34, a Master File Menu 36, an Import/Export Menu 38, and a Setup Menu 40. The user selects one of these menus by highlighting that option and pressing the return key. The Selection Menu 34 allows a user to select information and drawings to formulate a submittal in a select/print submittal step 42. The Master File Menu 36 allows a user to modify information in a data selection step 44. The Import/Export Menu 38 allows a user to import, export or delete drawing cross-reference files from the hard drive of the computer 12. Finally, the setup menu 40 allows a user to select a system setup screen 46 or a language main menu 48.

The system setup screen 46 allows a user to customize the program by entering specific information related to the user such as company, address, telephone number etc. This information may be used in cover letters generated by the select/print submittal step 42 as will be explained below. The system setup screen 46 also allows a user to control the printer 16, designate printing options, designate different storage devices and obtain system information. The language main menu 48 allows a user to modify the program using the TAS language tools.

FIG. 3 shows a selection screen 50 which is displayed when the Selection Menu 34 is selected from the Main Menu 32. The selection screen 50 presents a number of options relating to selecting and printing submittals and other information. Eight options are available to the user including a Select Electrical Submittal option 52, a Print Electrical Submittal option 54, a Select Diesel Submittal 56 option, a Print Diesel Submittal option 58, a Review Drawing Batch option 60, a Print Drawing Batch option 62, a Delete Drawing Batch option 64, and a Print List of Drawings option 66.

The diesel and electrical options (52-58) correspond to diesel and electrical fire pumps which are available and commonly known in the fire pump field. The batch options (60-64) allow the user to print batches of drawings. The Print List of Drawings option 66 allows a user to select from the drawings stored in the master file associated with the program.

The Select Electrical Submittal option 52 and Select Diesel Submittal option 56 operate in a similar manner when selected by a user. FIG. 4A shows a first submittal selection screen 70 which is displayed when the Select Electrical Submittal option 52 is selected. It is to be understood that a similar screen is displayed when the Select Diesel Submittal 56 option is selected.

The first submittal selection screen 70 displays four fields. These fields include a job information field 72, a customer information field 74, a processing information field 76, and a pop-up menu field 78. Each of these fields allow a user to enter requested information to be used in the printed submittal.

The pop up window 78 contains the choices available for the information fields in the job information field 72 and customer information field 74. The information in pop up window 78 is dependant on which field the user positions the cursor in. With regard to selection of the job information field 72, the user may scroll through the choices in pop up window 78 and press the return key to enter the selections in the job information field 72. Correspondingly, when the cursor is in the customer information field 74, the pop up window 78 will list customer names and codes. Selecting a customer field will fill in information such as the customer code, name, address and contacts. The choices are stored in the master data files which may be modified or accessed as will be described below.

Once job information is selected and entered in the job information field 72 and customer information is selected and entered into the customer information field 74, the user is prompted to display further selection screens. FIG. 4B shows a second submittal selection screen 80. The second submittal selection screen 80 has a fire pump information field 82, a motor information field 84, a system information field 86 and a fire pump accessory information field 88. The fire pump information field 82 has a pump type field 90 and a model field 92. Selecting the pump type field 90 displays a pop up menu with choices of pump types stored in the master data files. Similarly, selecting the pump model field 92 will display a pop up menu with choices of model types stored in the master data files. Selection of the pump type and pump model from the pop up menus causes the remainder of the information in the fire pump information field 82 to be populated. This information includes the gallons per minute (GPM), trimmed GPM, pounds per square inch (PSI), trimmed PSI, shutoff PSI, trimmed shutoff, speed, rotation, and description.

The motor information field 84 has a make field 94 which displays NEMA standard or particular motor manufacturers. By selecting the make field 94, a pop-up menu is presented to the user having information on model numbers, and other data. By selecting one of the choices in the pop-up menu, other information fields related to the selected model are entered in the motor information field 84. These other information fields include the horsepower (HP), volts, phase, frequency, FLA ("full load amps" of the motor), speed, frame, and description. Moving the cursor to the system information field 86 allows the user to enter the design suction PSI of the system as well as the calculated discharge PSI for the system.

The fire pump accessory information field 88 presents a list of accessories and thrive descriptions which may be ordered along with the chosen fire pump. Moving the cursor to the fire pump accessory information field 88 results in a pop-up menu being displayed listing available accessory choices. Once the cursor is in this pop-up menu, a user may select one or more of the listed accessories which will be added to the accessory list. After returning the cursor to the accessory information field 88, a third initial selection screen may be activated.

Figure 4C:
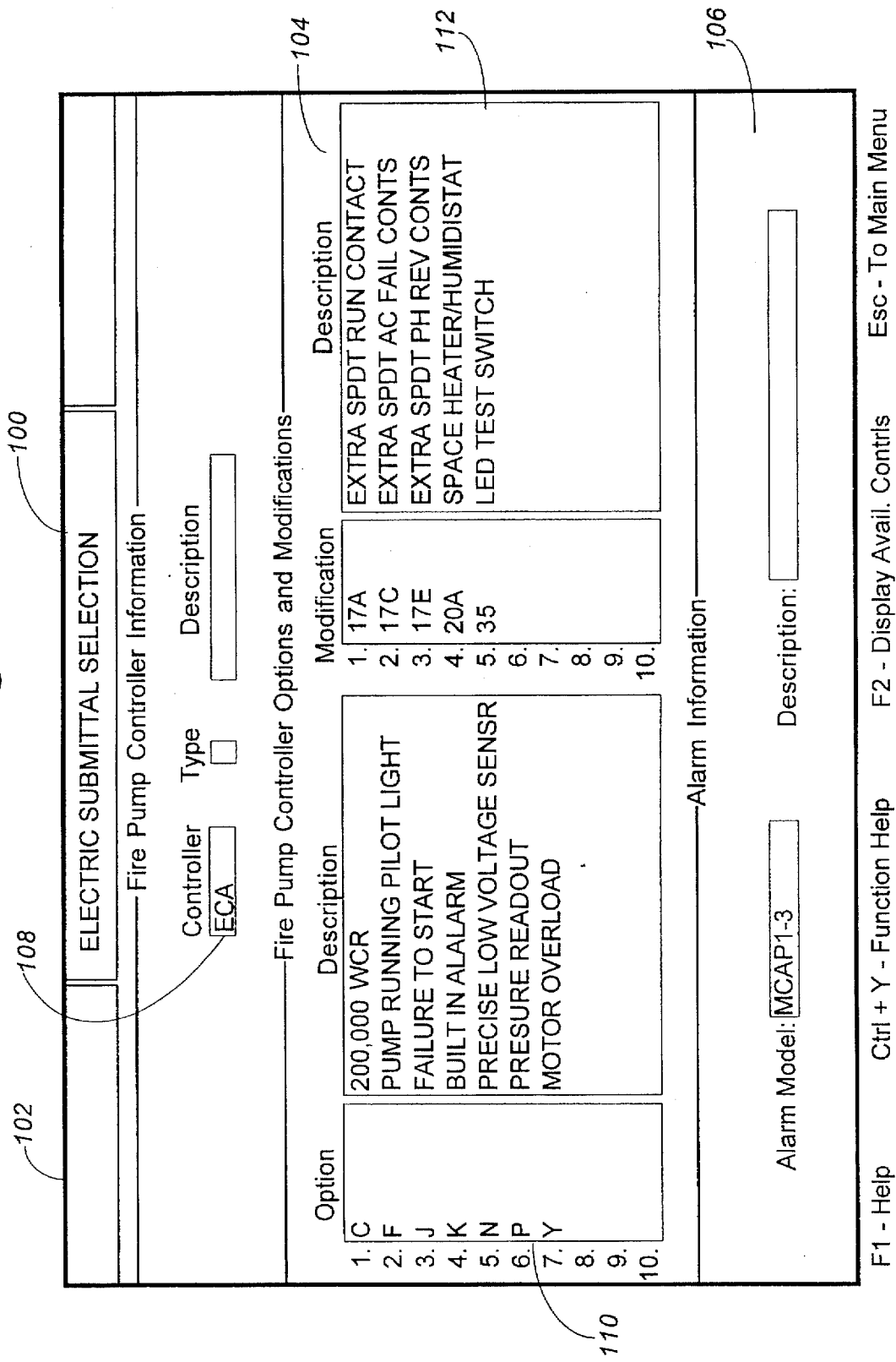
FIG. 4C shows a third submittal selection screen display according to the present invention.

FIG. 4C shows a screen display of a third submittal selection screen 100. The third submittal selection screen 100 has a fire pump controller information field 102, a fire pump controller options modification field 104 and an alarm information field 106. By moving the cursor to the fire pump controller information field 102, a user may select from the controller field which results in the display of a pop-up menu indicating the controller codes available. By selecting one of the control codes stored in this pop-up menu, controller, type and description data is entered in the fire pump controller information field 102.

After selecting the fire pump controller information and filling in the information of the fire pump controller information field 102, the cursor is moved to the fire pump controller options and modifications field 104. The fire pump controller and options modification field 104 lists a number of options and descriptions in the options field 110 and modifications in the modification field 112. Selecting either of these fields results in the display of a pop-up menu which gives a choice of options and/or modifications which the user may enter regarding the controller selected from the fire pump controller information field 102.

After the user selects the appropriate options and modifications and enters these selections in the option field 110 or the modification field 112 of the fire pump controller options modification field 104, the program will move the cursor to the alarm information field 106. The alarm information field 106 contains alarm model and description which may be selected from a pop-up menu. Once the appropriate alarm has been entered, a fourth initial submittal selection screen is called by the program.

FIG. 4D shows a fourth submittal selection screen 120 which is displayed after completing the third initial selection screen 100. The fourth initial selection screen 120 has a jockey pump information field 122, a jockey pump motor information 124, a jockey pump accessories field 126, a jockey pump controller information field 128, and a jockey pump controller options and modifications field 130. The jockey pump information field 122 contains information regarding the model, GPM, PSI and description. The user may select from a pop-up menu which displays choices of model numbers. By entering a particular model, the jockey pump information field 122 is populated with information relating to the particular model chosen.

The cursor is then moved to the jockey pump motor information field 124. The jockey pump motor information field contains a motor horsepower (HP) field 132 which allows the user to select various ranges of motor horsepower, and a volt A.C. field 134 which presents the user with a pop-up menu for selecting the voltage of the jockey pump motor. Selecting a voltage from the pop-up menu related to the volts A.C. field 134 results in the remaining information such as phase, frequency and description being entered in the jockey pump motor information field 124. After selecting the appropriate jockey pump motor information and populating the fields in the jockey pump motor information field 124, the cursor is then moved to the jockey pump accessory field 126.

A pop-up menu having the accessories which are available is used to select available accessories and thus populate the fields in the jockey pump accessories field 126. After selecting the accessories, the cursor may then be moved to the jockey pump controller information field 128 which allows a user to select a particular type of controller. Once the controller is selected from the pop-up menu, information regarding the controller and the type and the description are entered in the jockey pump controller information field 128.

The cursor may then be moved to the jockey pump controller options and modifications field 130. Jockey pump controller options and modification field 130 has an options field 136 and a modification field 138. Moving the cursor into either the options field 136 or the modification field 138 results in a pop-up menu which lists corresponding options and modifications which may be selected and entered into the options field 136 or the modification field 138.

Once data is entered in the fields of the four submittal selection screens 70, 80, 100 and 120, the submittal may be saved and the user may exit to the selection menu 32. Alternately, the user may select information for a new submittal. The select electrical submittal option 52 is one example of a preferred embodiment of the invention. The select diesel submittal option 56 operates in an identical manner, however, some of the fields are tailored specifically toward diesel engines as may be appreciated by one skilled in the art.

After entering the submittal information under the Select Electrical Submittal option 52 or the Select Diesel Submittal option 56, the submittal may be printed via either the Print Electrical Submittal option 54 or the Print Diesel Submittal option 58. When either of these options is selected, a submittal is printed by the program. FIG. 5 shows a print screen 68 which is displayed when either the print electrical submission option 54 or the print diesel submittal option 58 is selected. The user is requested to enter the job number to print, the number of submittal sets in the submittal letter, the number of submittal sets to be printed, the cover letter starting line, the submittal report starting line, as well as the option of whether to print immediately or send the submittals to a batch file. The user may select a pop-up menu to display the jobs which have been previously saved under either the select electrical submittal option 52 or the select diesel option 56 depending on whether the user is printing an electrical or diesel submittal.

A submittal includes a cover letter, a Submittal Selection Report, a Submittal Drawing Report, a Drawing Error Report, and the relevant drawings. The cover letter derives address and company information from the information input provided by the user under the system startup screen option 46. The cover letter also derives customer information from the customer information field 74 and details the number of submittals enclosed.

The Submittal Selection Report lists the information designated by the user in submittal selection. For example, for an electrical selection, the report would list information from the Fire Pump Information field 82, the system information field 86, the motor information field 84, the fire pump accessory field information field 88, the fire pump controller information field 102, the alarm information field 106, the jockey pump information field 122, the jockey pump motor information field 124, the jockey pump accessories field 126, and the jockey pump controller information field 128. These fields may differ somewhat for a diesel submittal selection report according to the different fields under the diesel selection option 56.

The Submittal Drawing Report lists the selected drawings, their drawing numbers, and their description. The program may also be directed to include other information or reports if desired. The Drawing Error Report is generated if the program is unable to print the requested drawings. The printed drawings are standard mechanical or electrical drawings corresponding to the selected fire pump, driver, and control equipment.

The information in the submittal files and presented in the submittal selection screens is stored in a master file associated with the program. The master file is typically stored on the hard drive coupled to the computer 12. Other storage mechanisms such as a CD-ROM may also be used to store the master file as long as such storage is readable by the computer 12.

The drawing files of the drawing cross-reference file are stored in Printer Control Language 5 (PCL5) for a Hewlett-Packard™ Laser printer. The drawings may also be scanned to become rasterized images or they may be taken from CAD/CAM programs. Other alternatives such as TIFF files may also be used. All drawings must be converted to Printer Control Language 5 (PCL5) for a Hewlett-Packard™ Laser printer to be accessed by the program. Once the appropriate drawings are selected, the data file corresponding to the selected drawing is copied from the hard drive of the computer 12 and is sent to the printer 16 via cable 18.

The user may also elect to place the generated submittal in a batch file by not printing immediately under the Print Electrical Submittal option 54 or the Print Diesel Submittal option 58. Any number of submittals may be stored for later processing. The batch file will be appended to include additional submittals. The submittals stored in the batch file may be printed by selecting the Print Drawing Batch option 62. The printing of the drawings then takes place as described above. The user may review the submittals contained in the current batch file by selecting Review Drawing batch option 60. Finally, the user may delete the entire current batch file by selecting Delete Drawing batch option 64.

Figure 6:
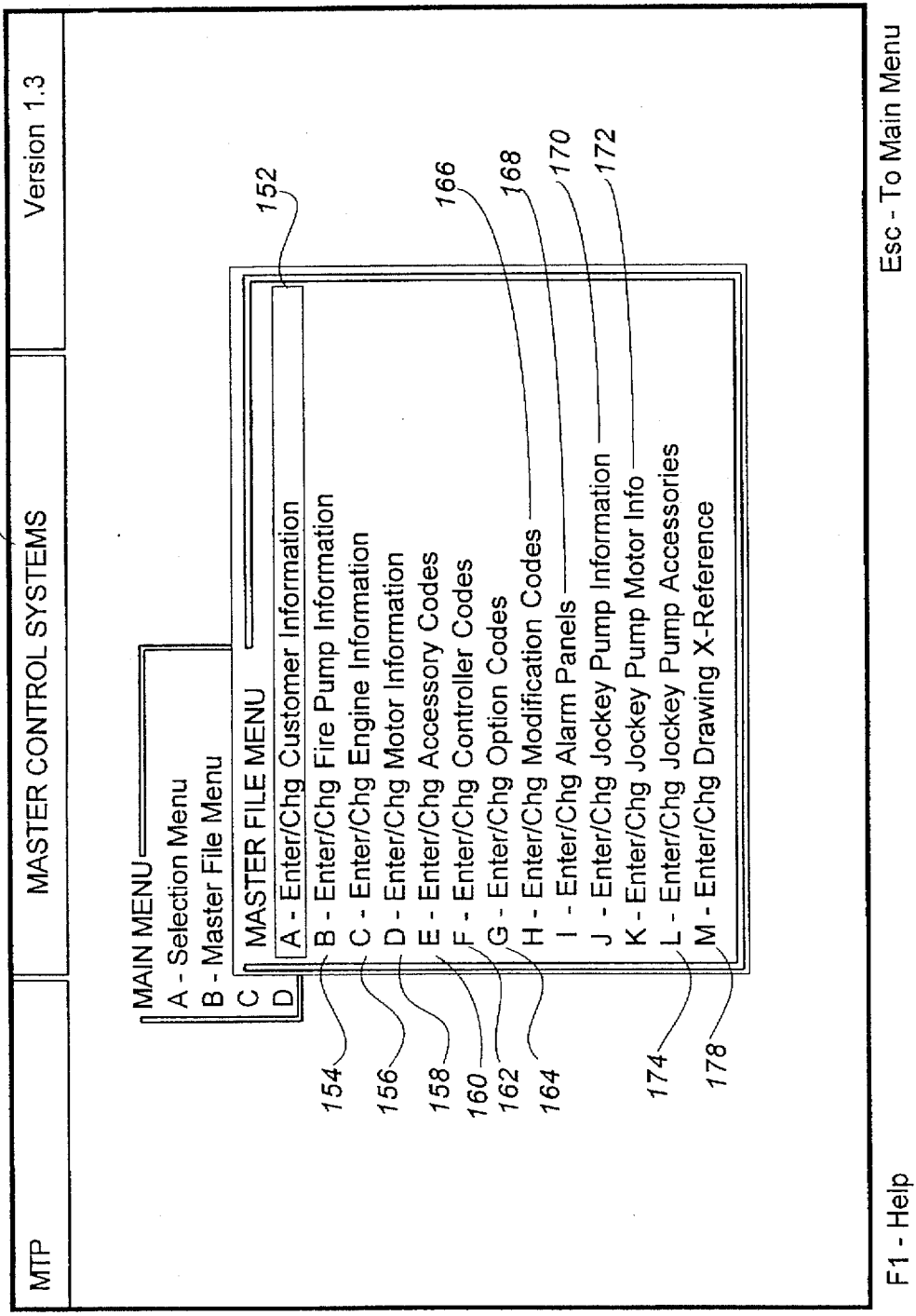
FIG. 6 shows an add/change screen display according to the present invention.

The present invention also allows a user to add information to or modify the program's master file. Selection of the Master File Menu 36 allows a user to add additional information to the master files. FIG. 6 shows an Add/Change Screen 150 which is displayed when the Master File Menu 36 is selected by a user. The Add/Change Screen 150 displays a number of fields corresponding to data in the master files which the user may change. Selection of each field also gives the user the option to delete a data record from the master data files. These fields include a Customer Information field 152, a Fire Pump field 154, an Engine field 156, a Motor field 158, an Accessory Codes field 160, a Controller Codes field 162, an Options Codes field 164, a Modification Codes field 166, an Alarm Panels field 168, a Jockey Pump Information field 170, a Jockey Pump Motor Information field 172, a Jockey Pump Accessories field 174, and a Drawing X-REF field 176. Each of the fields under the Change/Enter screen 150 are options available to the user in selecting submittals under the Selection Menu 34. Typically, it is more frequency desirable to add or change the Customer Information field 152, Fire Pump field 154 and the Drawing X-REF field 176.

In general, the Fire Pump field 154, Engine field 156, and Motor field 158 gives the user the option to change and add available types of each fire pump, engine or motor. The Accessory Codes field 160, Controller Codes field 162, Options Codes field 164, and Modification Codes field 166 allow a user to change and add codes which may be selected on the submittal selections. Additionally, the jockey pump fields 170-174 allow a user to change and modify data relating to the jockey pump information stored in the master files.

By way of example, FIG. 7 shows a master file screen 178 which is displayed when the fire pump field 154 is selected. Moving the curser around the master File screen 178 allows a user to modify fire pump information data including the fire pump type, model, GPM, PSI, speed, shut-off PSI, and description. When selected, the remainder of the fields 152, 156–158, 170–174 also allow a user to modify or change associated data. Specifically, the customer information field 152 when selected will allow a user to add a record or modify the customer code, customer name, address, telephone number, and contact information fields in a current customer record. The selection of the engine field 156 allows a user to modify the engine make, model, volts DC, polarity (positive or negative), and description. Selecting the motor field 158 allows a user to change the motor make, model, motor horsepower, volts AC, phase, frequency, motor speed, frame number, FLA, or description. The jockey pump information field 170 allows a user to change model, GPM, PSI and description. The jockey pump motor information field 172 allows a user to change motor horsepower, volts AC, phase, frequency and description. The jockey pump motor accessories field 174 allows a user to change accessory codes and descriptions.

Figure 8:
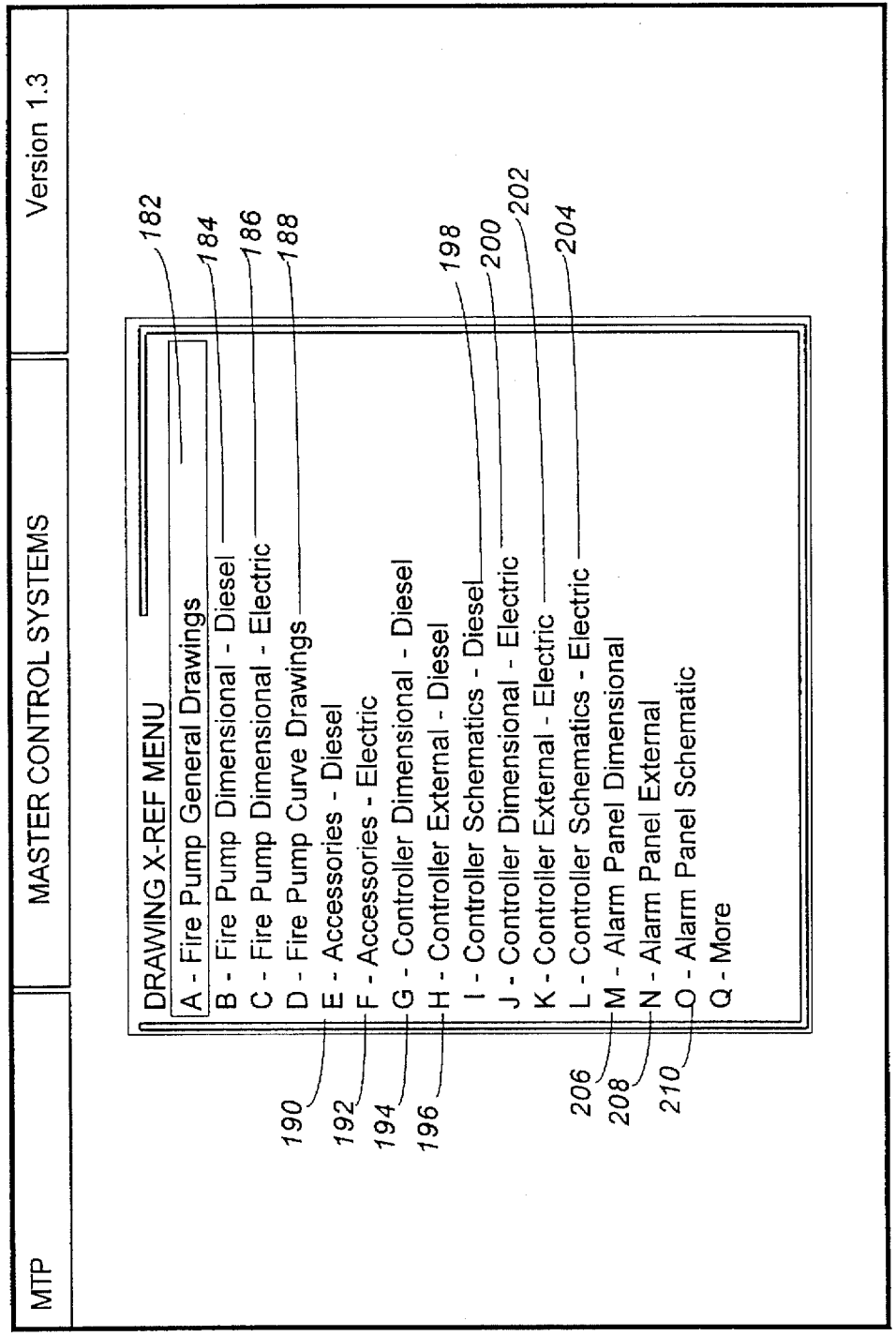
FIG. 8 shows a first drawing selection screen displayed according to the present invention.
Figure 9:
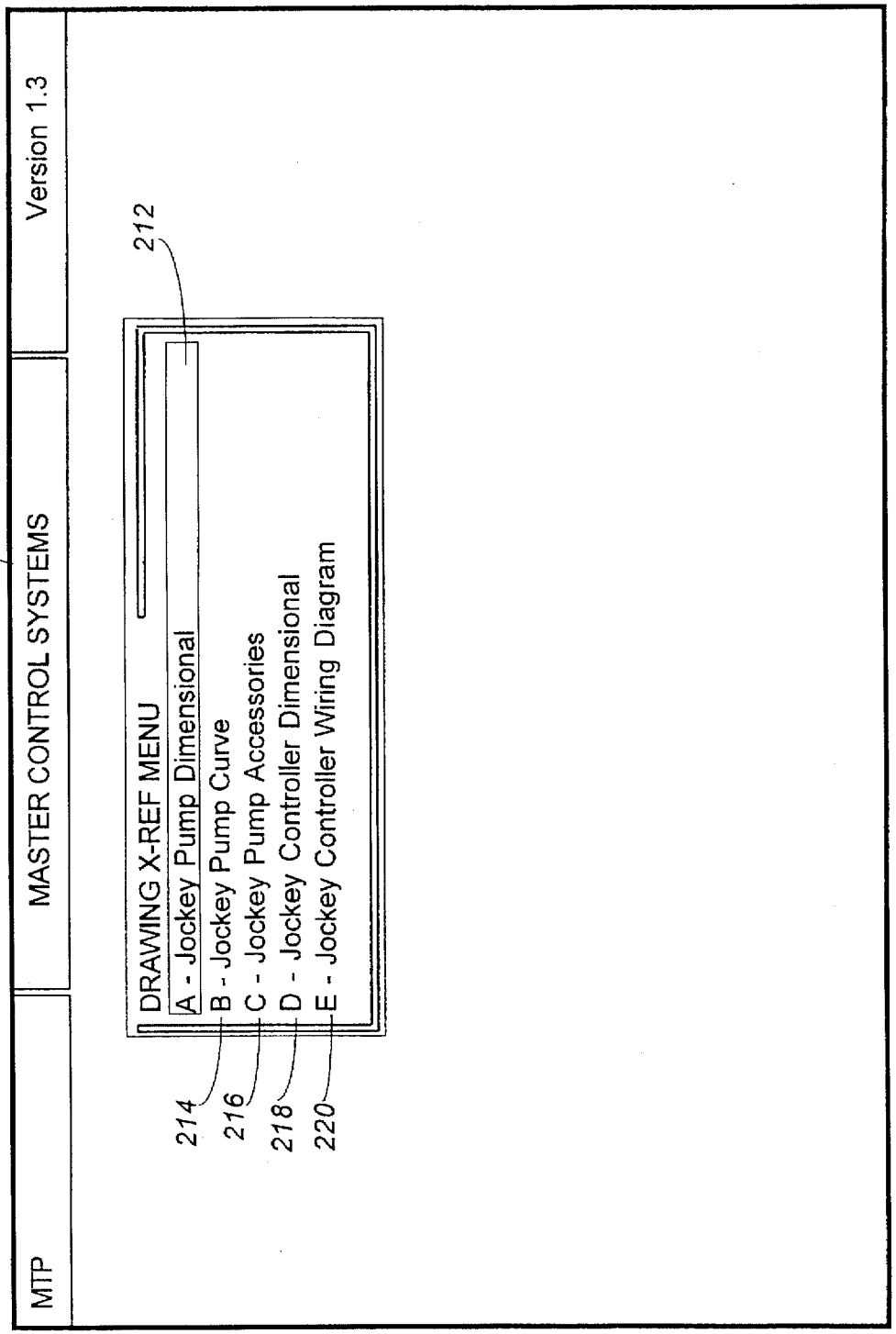
FIG. 9 shows a second drawing selection screen displayed according to the present invention.

FIGS. 8 and 9 show drawing selection screens 180 and 181 which are displayed when the Drawing X-REF field 176 is selected. The drawing selection screen 180 allows a user to select specific drawings based on a selection criteria. The drawing selection screen 180 includes a Fire Pump General Drawings field 182, a Fire Pump Dimensional—Diesel field 184, a Fire Pump Dimensional—Electric field 186, a Fire Pump Curve Drawings field 188, a Fire Pump Accessories—Diesel field 190, a Fire Pump Accessories—Electrical field 192, a Controller Dimensional—Diesel field, 194, a Controller Externals—Diesel field 196, a Controller Schematics—Diesel field 198, a Controller Dimensional—Electric field 200, a Controller Externals—Electric field 202, a Controller Schematics—Electric field 204, an Alarm Panel Dimensional field 206, an Alarm Panel Externals field 208, and an Alarm Panel Schematics field 210 screen 181 displays, a Jockey Pump Dimensional field 212, a Jockey Pump Curve field 214, a Jockey Pump Accessories field 216, a Jockey Pump Controller Dimensional field 218, and a Jockey Pump Controller Wiring Diagram field 220. The drawing selection screen 180 displays fields corresponding to different categories of drawings available in the selection menu 34. Of course additional fields corresponding to other categories of drawings may be added if desired.

FIG. 10 shows a master file drawing screen 222 displayed when a user selects one of the drawing fields 182–220. The master file drawing screen 222 presents a user with a selection criteria field 224 for sorting drawings as well as a list field 226 having drawing numbers and descriptions under the selected types. FIG. 10 shows the master file drawing screen displayed if the fire pump curve drawing field 188 was selected. The screen 222 allows a user to select drawings by pump type, pump model, GPM, PSI, speed, or driver. Of course other drawing types will have different selection criteria as will be explained.

Selecting the fire pump general drawing field 182 allows a user to select drawings by pump type or driver type. Selecting the fire pump dimensional-diesel field 184 allows a user to select drawings by either pump type, pump model, engine make, engine model, rotation, accessory code, or accessory type. Selecting the fire pump dimensional electrical field 186 allows a user to select drawings by pump type, pump model, motor frame, rotation, accessory code, or accessory type. Selecting the accessories diesel field 190 allows a user to select drawings by accessory code, driver, pump type, pump model, GPM, PSI, engine make, engine model, or engine voltage. Selecting by the accessories—electric field 192 allows the user to select drawings by accessory code, driver, pump type, pump model, GPM, PSI, motor make, or motor model.

Selecting the controller dimensional—diesel field 194 allows the user to select drawings by controller model, option code, option type, modification code, or modification type. Selecting the controller external—diesel field 196 allows a user to select drawings by controller model, engine make, engine model, option code, option type, modification code, or modification type. Selecting the controller schematics—diesel field 198 allows a user to select drawings based on controller model, engine make, engine model, option code, option type, modification code, or modification type.

Selecting the controller dimensional—electric field 200 allows a user to select drawings based on controller model, motor horsepower, motor voltage AC, option code, option type, modification code, or modification type. Selecting the controller external—electrical field 202, allows a user to select drawings based on controller model, option code, option type, modification code, or modification type. Selecting the controller schematics—electric field 204 allows a user to select drawings based on controller model, option code, option type, modification code, or modification type. Selecting the alarm dimensional field 206, alarm panel external field 208, or the alarm panel schematics field 210 allows the user to select drawings by alarm type.

Selecting the jockey pump dimensional field 212 or the jockey pump curve field 214 allows a user to select drawings by jockey pump model, GPM, or PSI. Selecting the jockey pump controller accessory field 216 allows the user to select drawings based on jockey pump accessory, model, GPM, or PSI. Selecting the jockey pump controller—dimensional field 218 allows the user to select drawings based on controller model, option code, option type, modification code, or type. Finally, selecting the jockey pump wiring diagram field 220 allows the user to select drawings based on controller model, jockey pump controller motor phase, option code, option type, modification code, or modification type. Of course, drawings may be printed from any of these selections or by specifying the particular drawing number listed under any of the fields selected from fields 182–220.

The selection of the Import/Export menu 38 from the main menu 30 provides a user with three options to copy or add drawing cross-reference files. FIG. 11 shows an import/ export screen 230 displayed when the import/export menu 38 is selected. First, the user may select an Import Drawing option 232. This option allows a user to import or copy a drawing cross-reference file. The program requests the user to enter the import file name and the X-Reference drawings type from another storage device such as a floppy disk, tape or CD-ROM. The program then copies the drawing cross reference file onto the hard drive of the computer 12. The X-Reference drawing type is derived from the drawing types listed under the drawing selection screen 180.

A second option available to a user under the Import/ Export menu 38 is an export option 234 which allows a user to copy a drawing cross-reference file to another storage device such as a floppy disk, or tape. The export function asks the user to enter both the X-Reference drawing type as well as the drawing name to locate the drawing file in the master file.

A third option is a delete drawing option 236 which allows a user to delete a drawing cross-reference file of a specific X-Reference type. The drawing file is deleted from the master files when this command is selected. Appropriate warnings are given to the user before executing this command.

While one example of the system for managing end recording fire pump drawings and related documentation have been disclosed, the appended claims are intended to cover all such changes and modifications which fall in the true spirit and scope of this invention.

We claim:

1. A system for producing submittals for a fire pump system including a fire pump, driver, and control equipment, the system comprising:

a computer having a storage device and an input device;

a printer coupled to said computer;

a master file stored in said storage device, said master file having data representing fire pump, driver, and control equipment drawings and information related to said fire pump, driver, and control equipment drawings;

a means for deriving selected information and selected drawings from said storage device of said computer and printing a submittal for a fire pump system on said printer including drawings and information for a fire pump system including a selected fire pump, driver and control equipment.

2. A method for producing submittals for a fire pump system, including a fire pump, driver, and control equipment, using a computer having a storage device, the method comprising the steps of:

storing data representing a plurality of drawings related to fire pump, driver, and control equipment in a master file;

storing further data related to said plurality of drawings in said master file;

selecting submittal data from said further data related to said drawings for selected fire pump, drive and control equipment;

selecting drawings from said selected submittal data for selected fire pump, drive and control equipment; and composing a submittal for a fire pump system including said selected submittal data and said selected drawings derived from said master file for the selected fire pump, driver and control equipment.

3. The method of claim 2 further comprising the step of printing said submittal.

4. The method of claim 2 further comprising the steps of:

storing said submittal in a batch file;

selecting a second set of submittal data from said further data related to said drawings;

selecting a second set of drawings from said second set of submittal data;

composing a second submittal including said selected second set of data and said second set of selected drawings;

storing said second submittal in said batch file; and printing said batch file.

5. The method of claim 2 wherein said data representing a plurality of drawings is formatted in Printer Control Language (PCL).

6. The method of claim 5 further comprising the step of converting data representing drawings to a data formatted in Printer Control Language (PCL).

7. The method of claim 2 wherein said further data comprises:

a plurality of records relating to customer information;

a plurality of records relating to fire pump information;

a plurality of records relating to fire control system information;

a plurality of records relating to fire pump accessory information;

a plurality of records relating to fire pump control information; and a plurality of records relating to jockey pump information.

8. The method of claim 7 wherein said step of selecting said further submittal data further comprises the steps of:

selecting a customer record from said plurality of records relating to customer information;

selecting a fire pump record from said plurality of records relating to fire pump information;

selecting a fire control system record from said plurality of records relating to fire control system information;

selecting a fire pump accessory record from said plurality of records relating to fire pump accessory information;

selecting a fire pump control record from said plurality of records relating to fire pump control information; and selecting a jockey pump information record from said plurality of records relating to jockey pump information.

9. The method of claim 8 wherein said step of composing a submittal further comprises:

composing a cover letter incorporating said selected customer record;

composing a submittal selection report incorporating said summary derived from said selected fire pump record, said selected fire control system record, said selected fire pump accessory record, said selected fire pump control record, and said selected jockey pump information record; and composing a drawing list having information related to said selected drawings.

10. A method for storing data on components for fire pump systems, including fire pump, driver, and control equipment, on a computer having a storage device, the method comprising the steps of:

storing a plurality of drawings related to components for fire pump systems in a master file in the storage device, each of said plurality of drawings related to a component of a fire pump system; and storing data related to said plurality of drawings in said master file, said data being composed of a plurality of records relating to a component of a fire pump system, each of said plurality of records having at least one field defining characteristics of said component of fire pump system.

11. The method of claim 10 further comprising the steps of:

selecting a drawing from said plurality of stored drawings; and printing said selected drawing.

12. The method of claim 10 further comprising the step of:

selecting a drawing from said plurality of stored drawings; and exporting said selected drawing to an external storage device.

13. The method of claim 10 further comprising the steps of:

selecting a record from said plurality of records;

selecting a field from said at least one field; and modifying said selected field.

14. The method of claim 10 further comprising the steps of:

selecting a characteristic defining said at least one field from said plurality of records;

listing drawings related to said records having fields with identical characteristics as said selected characteristic.

15. A system for producing submittals for a fire pump system including fire pump, driver, and control equipment, the system comprising:

a computer having a storage device and an input device;

a printer coupled to said computer;

a master file stored in said storage device, said master file including data representing a plurality of fire pump, driver, and control equipment drawings and textual information related to said fire pump, driver, and control equipment drawings;

a selection means for selecting certain drawings and certain textual information from said master file stored in said storage device of said computer and printing a submittal for a fire pump system containing said certain drawings and certain textual information on said printer relating to selected fire pump, driver, and control equipment.

16. A method for producing submittals for a fire pump system including a fire pump, driver, and control equipment using a computer having a storage device, the method comprising the steps of:

storing data representing a plurality of drawings related to fire pump, driver, and control equipment in a master file;

storing textual data related to said plurality of drawings in said master file;

selecting data representing certain drawings from said stored data for selected fire pump, driver, and control equipment;

selecting data from said textual data related to said certain drawings for selected fire pump, driver, and control equipment; and composing a submittal for a fire pump system including said selected drawings and said selected textual data for the selected fire pump, driver and control equipment.

17. The method of claim 16 further comprising the step of printing said submittal.

18. The method of claim 16 further comprising the steps of:

storing said submittal in a batch file;

selecting a second set of data representing a second set of certain drawings from said stored data;

selecting a second set of data from said textual data related to said second set of certain drawings;

composing a second submittal including said selected second set of selected drawings and said second set of selected textual data;

storing said second submittal in said batch file; and printing said batch file.

19. The method of claim 16 wherein said data representing a plurality of drawings is formatted in Printer Control Language (PCL).

20. The method of claim 19 further comprising the step of converting data representing drawings to a data formatted in Printer Control Language (PCL).

21. The method of claim 16 wherein said further textual data comprises:

a plurality of records relating to customer information;

a plurality of records relating to fire pump information;

a plurality of records relating to fire control system information;

a plurality of records relating to fire pump accessory information;

a plurality of records relating to fire pump control information; and a plurality of records relating to jockey pump information.

22. The method of claim 21 wherein said step of selecting said textual data comprises the steps of:

selecting a customer record from said plurality of records relating to customer information;

selecting a fire pump record from said plurality of records relating to fire pump information;

selecting a fire control system record from said plurality of records relating to fire control system information;

selecting a fire pump accessory record from said plurality of records relating to fire pump accessory information;

selecting a fire pump control record from said plurality of records relating to fire pump control information; and selecting a jockey pump information record from said plurality of records relating to jockey pump information.

23. The method of claim 22 wherein said step of composing a submittal further comprises:

composing a cover letter incorporating said selected customer record;

composing a submittal selection report incorporating said summary derived from said selected fire pump record, said selected fire control system record, said selected fire pump accessory record, said selected fire pump control record, and said selected jockey pump information record; and composing a drawing list having information related to said selected drawings.

24. A method for storing data relating to components for fire pump systems including fire pump, driver and control equipment on a computer having a storage device, the method comprising the steps of:

storing a plurality of drawings related to components for a fire pump system in a master file in the storage device, each of said plurality of drawings related to a component of a fire pump system; and storing textual data related to said plurality of drawings in said master file, said textual data being composed of a plurality of records, each relating to a component of a fire pump system, each of said plurality of records having at least one field defining characteristic of said component of a fire pump system.

25. The method of claim 24 further comprising the steps of:

selecting a drawing from said plurality of stored drawings; and printing said selected drawing.

26. The method of claim 24 further comprising the step of:

selecting a drawing from said plurality of stored drawings; and exporting said selected drawing to an external storage device.

27. The method of claim 24 further comprising the steps of:

selecting a record from said plurality of records;

selecting a field from said at least one field; and modifying said selected field.

28. The method of claim 24 further comprising the steps of:

selecting a characteristic defining said at least one field from said plurality of records;

listing drawings related to said records having fields with identical characteristics as said selected characteristic.

\* \* \* \* \*